(12) United States Patent
Kobayashi et al.

(10) Patent No.: US 6,971,335 B2
(45) Date of Patent: Dec. 6, 2005

(54) WATER HEATER

(75) Inventors: Toshihiro Kobayashi, Nagoya (JP); Tomohiro Ichikawa, Nagoya (JP)

(73) Assignee: Paloma Industries, Limited, Nagoya (JP)

( * ) Notice: Subject to any disclaimer, the term of this patent is extended or adjusted under 35 U.S.C. 154(b) by 92 days.

(21) Appl. No.: 10/917,999

(22) Filed: Aug. 13, 2004

(65) Prior Publication Data

US 2005/0039704 A1    Feb. 24, 2005

(30) Foreign Application Priority Data

Aug. 20, 2003  (JP) ............................... 2003-296107
Dec. 10, 2003  (JP) ............................... 2003-411181

(51) Int. Cl.$^7$ ............................................... F22B 1/18
(52) U.S. Cl. ...................... 122/32; 122/31.1; 122/122; 122/4 D
(58) Field of Search ............................... 122/4 D, 18.1, 122/13.1, 32, 367.3

(56) References Cited

U.S. PATENT DOCUMENTS 4,393,815 A * 7/1983 Pedersen et al. ........... 122/31.1
5,184,600 A * 2/1993 Astle, Jr. .................... 126/113
5,305,735 A * 4/1994 Welden ..................... 126/355.1
5,765,546 A * 6/1998 Mandeville et al. ...... 126/350.1
6,345,769 B2 * 2/2002 MacIntyre ................... 237/8 R

FOREIGN PATENT DOCUMENTS

JP    2002-098413 A1    4/2002
JP    2002-195645 A1    7/2002
JP    2002-333212 A1    11/2002

* cited by examiner

Primary Examiner—Gregory Wilson

(74) Attorney, Agent, or Firm—Burr & Brown

(57) ABSTRACT

A water heater is provided in which neutralization process of drain is not required and an excellent heat efficiency is achieved. A route of exhaust gas which is passing through the main heat exchanger 18 is divided into a first exhaust gas chamber 23 having a secondary heat exchanger 19 and a second exhaust gas chamber 24 having a drain evaporator. Because of this, hot exhaust gas which is passing through only the main heat exchanger 18 flows into both the secondary heat exchanger 19 and the drain evaporator 100. Therefore, in the secondary heat exchanger 19 exhaust gas heat can be efficiently recovered by utilizing the hot exhaust gas, and in the drain evaporator 100 drain can be evaporated efficiently by utilizing the hot exhaust gas.

2 Claims, 2 Drawing Sheets

WATER HEATER

BACKGROUND OF THE INVENTION

This application claims the benefit of Japanese Patent Application Numbers 2003-296107 filed on Aug. 20, 2003 and 2003-411181 filed on Dec. 10, 2003, the entirety of which is incorporated by reference.

1. Field of the Invention

The present invention relates to a water heater having a heat exchanger which heats flowing water by combustion exhaust gas.

2. Description of Related Art

Conventionally, a water heater is known, which includes a heat exchanger with which a cold water supply pipe and a hot water outlet are connected, a burner which heats the heat exchanger and a blower which supplies fresh air for combustion to the burner.

In this water heater, the heat exchanger heats flowing water by combustion exhaust heat from the burner, and hot water is discharged from the hot water outlet.

However, in such a water heater, hot exhaust gas is discharged from the heat exchanger even if heat recovery is insufficient for preventing drain generation therein, whereby it is difficult to achieve high heat exchange efficiency.

Drain is generated when the exhaust gas reaches the dew point (approximately 50–60° C.). Theoretically, it is possible to recover sensible heat in the exhaust gas while preventing drain generation by exchanging heat until the dew point. However, since a heat exchanger has one portion with low temperature such as a heat transfer tube through which water flows, the exhaust gas is supposed to be discharged with a fairly high temperature in order to prevent drain generation at the portion. As a result, sensible heat is not recovered sufficiently.

In order to improve heat recovery efficiency of the exhaust gas (hereinafter, it is referred to as heat efficiency), a condensing water heater is provided which recovers not only sensible heat of the exhaust gas but also latent heat by condensing vapor of the exhaust gas.

The condensing water heater has a main heat exchanger and a secondary heat exchanger. The main heat exchanger is provided at the upstream of the exhaust gas route for mainly recovering sensible heat, and the secondary heat exchanger is provided at the downstream of the exhaust gas route for mainly recovering latent heat.

In such a condensing water heater, almost all of heat energy can be recovered since the secondary heat exchanger can recover the latent heat which has not been recovered by the main heat exchanger.

However, in the above condensing water heater, condensed vapor (hereinafter, it is referred to as drain) generated while latent heat is recovered becomes acidic with approximately a level of pH3, because the condensed vapor reacts chemically with SOx or NOx in the exhaust gas. Due to this, neutralization process is required before the drain is discharged into common drainage route, such as sewage.

In order to cope with this problem, in a conventional condensing water heater, a drain neutralization apparatus has been required as recited in Japanese Patent Publication of unexamined application No. 2002-195645, and thus, the cost is fairly expensive. Moreover, it is necessary to change a neutralizing agent used in the neutralization apparatus for a certain period, which is a heavy burden for a user.

In order to solve the above problem, a water heater is proposed in which drain generated in the secondary heat exchanger is to be evaporated by being contacted with the exhaust gas as disclosed in Japanese Patent Publication of unexamined application No. 2002-98413.

The above-mentioned water heater has a main heat exchanger, a secondary heat exchanger and a drain evaporator in a common exhaust gas route. In the main heat exchanger, sensible heat in the exhaust gas is recovered. In the secondary heat exchanger, drain is generated, and latent heat and sensible heat which has not been recovered in the main heat exchanger are recovered. In the drain evaporator, drain generated in the secondary heat exchanger evaporates by using heat of exhaust gas. In this water heater, the main heat exchanger which recovers sensible heat should be provided with the uppermost stream of the exhaust gas route. However, secondary heat exchanger and the drain evaporator may be provided arbitrarily.

According to this water heater, the same amount of heat as that of latent heat recovered by the secondary heat exchanger is used for drain evaporation, resulting that latent heat is not recovered. However, in the secondary heat exchanger the temperature of the exhaust gas can be lowered below the dew point while heat of the exhaust gas is recovered. In other words, it is not necessary to keep the exhaust gas at a high temperature in the secondary heat exchanger in order to prevent drain generation, thereby improving recovery efficiency regarding sensible heat compared to an ordinary water heater. Further, in this case it is unnecessary to provide a drain neutralization apparatus with the water heater, which makes the cost lower.

However, in the prior art, as the secondary heat exchanger and the drain evaporator are provided with a common exhaust gas route, the following problems existed.

First, when the drain evaporator provided with the exhaust gas route is located at the downstream of the secondary heat exchanger, most of exhaust gas heat is recovered by both the main heat exchanger and the secondary heat exchanger until it reaches the drain evaporator. While the temperature of the exhaust gas is lowering, the saturated humidity of the exhaust gas is lowered and getting close to the actual humidity. It is generally known that evaporating speed R [kg/hr.m$^3$] of water in ordinary state is proportional to the difference between the saturated humidity of the air Hw [kg/kg] and the actual humidity H [kg/kg] as shown in a formula below, whereby if exhaust gas whose humidity is close to the saturated humidity contacts the drain, little drain evaporates actually.

(Evaporating speed $R$)=(constant $k$)×((saturated humidity $Hw$)−(actual humidity $H$))

Due to this, in the above configuration, it is necessary to limit recovery efficiency of the exhaust gas purposely in order to evaporate received drain completely.

On the other hand, when the drain evaporator provided with the exhaust gas route is located at the upstream of the secondary heat exchanger, heat energy of the exhaust gas is wasted away before it reaches the secondary heat exchanger since the heat energy is utilized when the drain turns into gas in the drain evaporator. That is, heat energy of exhaust gas is converted into the latent heat of the gas. Thus, the temperature of the exhaust gas which reaches to the secondary heat exchanger falls. Moreover, it is generally known that the speed of heat exchange, while the exhaust gas remains gaseous (that is, when sensible heat is recovered), is proportional to the difference in temperature between the exhaust heat and the heat transfer tube.

Therefore, the temperature of the exhaust gas in the secondary heat exchanger becomes lower, resulting that the recovery efficiency of the sensible heat is lowered.

SUMMARY OF THE INVENTION

In order to solve the above problems, in accordance with a first aspect of the present invention, a water heater includes a burner for burning fuel gas in a combustion chamber; a main heat exchanger which recovers sensible heat from exhaust gas discharged from the burner to heat flowing water in a heat transfer tube; a secondary heat exchanger which recovers sensible heat which has not been recovered in the main heat exchanger along with latent heat from the exhaust gas which is passing through the main heat exchanger to heat the flowing water in the heat transfer tube, and a drain evaporator which heats and evaporates drain generated by recovery of the latent heat in the secondary heat exchanger, wherein a route of the exhaust gas which is passing through the main heat exchanger is divided into a first exhaust route and a second exhaust route, and the secondary heat exchanger is provided with the first exhaust route and the drain evaporator is provided with the second exhaust route.

In the water heater according to the first aspect having the above configuration, hot exhaust gas passing through the main heat exchanger directly flows into the secondary heat exchanger and the drain evaporator respectively. By utilizing this hot exhaust gas, in the secondary heat exchanger heat recovery is conducted efficiently and in the drain evaporator drain is evaporated efficiently.

In other words, in the secondary heat exchanger where heat is exchanged between the exhaust gas and the secondary heat transfer tube, hot exhaust gas is desired in terms of a speed of heat transfer. Similarly to the secondary heat exchanger, in the drain evaporator in which the drain is evaporated by utilization of exhaust gas heat, hot exhaust gas having an excellent evaporation faculty is desired. From the above points, the present invention is preferable because hot exhaust gas flows into both the secondary heat exchanger and the drain evaporator.

Therefore, in the present invention the drain evaporator evaporates drain efficiently with hot exhaust gas and the secondary heat exchanger efficiently recovers exhaust gas heat by utilization of the hot exhaust gas.

A water heater in accordance with a second aspect of the present invention, a water heater includes a burner for burning fuel gas in a combustion chamber; a main heat exchanger which recovers sensible heat from exhaust gas discharged from the burner to heat flowing water in a heat transfer tube; a secondary heat exchanger which recovers sensible heat which has not been recovered in the main heat exchanger along with latent heat from the exhaust gas which is passing through the main heat exchanger to heat the flowing water in the heat transfer tube, and a drain evaporator which heats and evaporates drain generated by recovery of the latent heat in the secondary heat exchanger, wherein on a route of the exhaust gas which is passing through the main heat exchanger, the secondary heat exchanger and the drain evaporator are disposed in parallel avoiding that one of them is located at the upstream or downstream of the other.

In the water heater according to the second aspect having the above configuration, in addition to the effects of the first aspect, hot exhaust gas passing through the main heat exchanger directly flows into the secondary heat exchanger and the drain evaporator respectively.

DESCRIPTION OF THE PREFERRED EMBODIMENT

To clarify the above-described configuration and operation of the present invention, the preferred embodiment of the present invention will be explained below.

Figure 1:
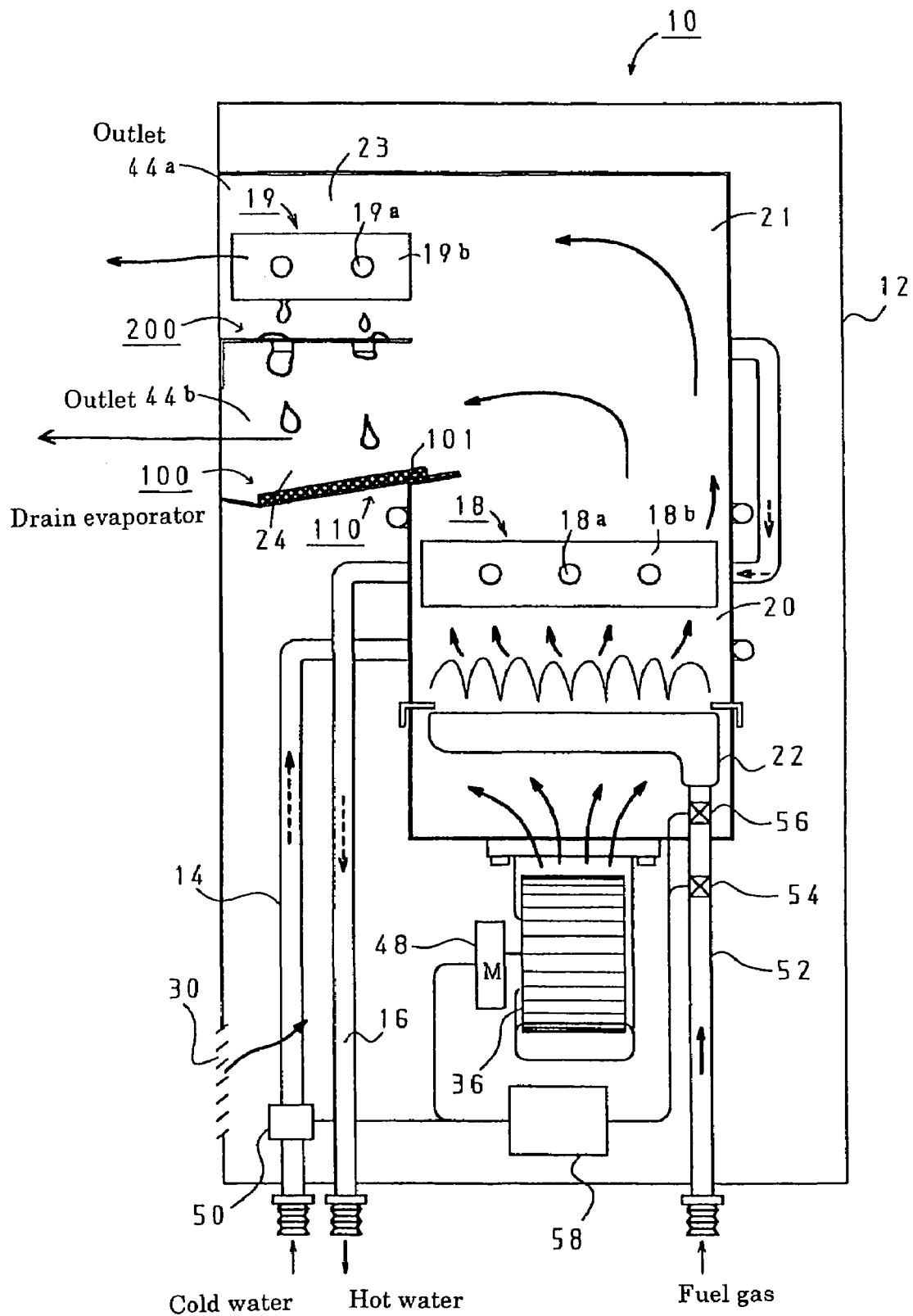
FIG. 1 is an explanatory view of a water heater of the embodiment of the present invention.

As shown in FIG. 1, a water heater according to the embodiment of the present invention includes an apparatus casing 12 which has a combustion chamber 20 below which a blower 36 connected with a DC motor 48 is provided. It should be noted that the apparatus casing 12 has an inlet 30 for supplying air for combustion.

In the combustion chamber 20, provided are, from the downstream side, a burner 22 for burning mixed gas made of fuel gas and primary air from the blower 36, and a main heat exchanger 18 for recovering almost all sensible heat of exhaust gas discharged from the burner 22. Above the main heat exchanger 18, a hot exhaust gas chamber 21 is provided into which still hot exhaust gas passing through the main heat exchanger 18 flows. At the lateral side of the hot exhaust gas chamber 21, a first exhaust gas chamber 23 and a second exhaust gas chamber 24 are provided so as to be divided into upper and lower portions. An exhaust gas dividing portion 200 provided at the middle of the lateral side of the hot exhaust gas chamber divides an exhaust gas route into the first exhaust gas chamber 23 and the second exhaust gas chamber 24 in order to make independent exhaust gas routes.

Moreover, the first exhaust gas chamber 23 and the second exhaust gas chamber 24 are provided in parallel avoiding that one of them is located at the upstream or downstream of the other.

At the first exhaust gas chamber 23, provided is a secondary heat exchanger 19 which recovers sensible heat that has not been recovered in the main heat exchanger 18 along with latent heat.

At the second exhaust gas chamber 24, provided is a drain evaporator 100 which heats and evaporates drain generated in the secondary heat exchanger 19.

Moreover, on a route of exhaust gas passing through the main heat exchanger, the secondary heat exchanger and the drain evaporator are disposed in parallel avoiding that one of them is located at the upstream or downstream of the other.

The exhaust gas dividing portion 200 has a plurality of burring holes 202a for guiding drain generated in the secondary heat exchanger 19 to the drain evaporator 100. A detailed explanation of the exhaust gas dividing portion 200 will be described later.

At the lateral side of the first exhaust gas chamber 23 and the second exhaust gas chamber 24, outlets 44a, 44b which discharge exhaust gas after heat recovery to the outside of the combustion chamber 20 are provided.

These outlets 44a and 44b are facing to a casing outlet which opens at the apparatus casing 12.

Water tubes provided in the apparatus casing 12 are, from the upstream side, a cold water supply pipe 14 which surrounds the combustion chamber 20 from the outside, a secondary heat transfer tube 19a provided with the secondary heat exchanger 19, a main heat transfer tube 18a provided with the main heat exchanger 18, and a hot water outlet 16.

The cold water supply pipe 14 has a water side control unit 50 which includes a water flow sensor and a water governor.

The secondary heat transfer tube 19a is made of stainless steel, and in the rear direction thereof it has many fins 19b for recovering heat of exhaust gas which is passing through the main heat exchanger 18 and for guiding generated drain into the exhaust gas dividing portion 200 which will be explained later.

The main heat transfer tube 18a has many heat recovery fins 18b for recovering heat of exhaust gas in the rear direction thereof.

Next, the exhaust gas dividing portion 200 and the drain evaporator 100 will be explained.

The exhaust gas dividing portion 200 is provided right under the secondary heat exchanger 19. It divides exhaust gas passing through the main heat exchanger 18 into two ways, and guides the exhaust gas into the secondary heat exchanger 19 and the drain evaporator 100 while drain generated in the secondary heat exchanger 19 is received at the exhaust gas dividing portion 200.

Figure 3:
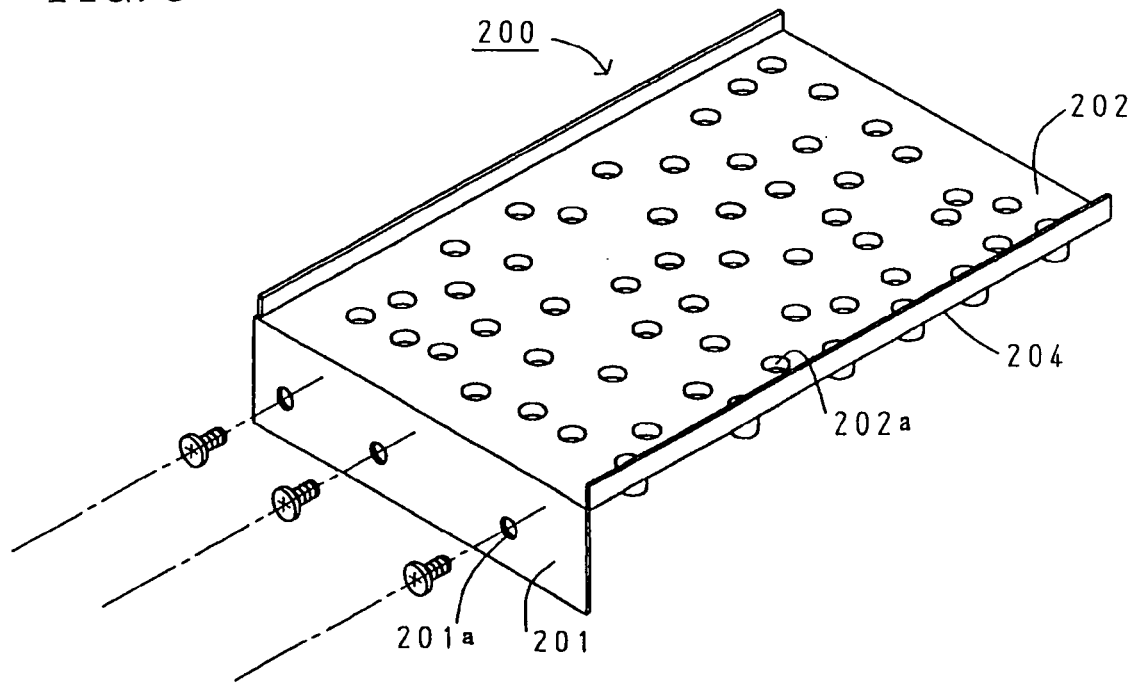
FIG. 3 is an explanatory view of a drain receiving plate of the embodiment of the present invention.

As shown in FIG. 3, the exhaust gas dividing portion 200 is formed by bending one stainless steel plate. It includes a casing fixation portion 201 for fixing itself to the apparatus casing 12 and a drain receiving portion 202 for receiving drain generated in the secondary heat exchanger 19.

On the casing fixation portion 201, provided is a screw hole 201a into which a stainless steel screw is inserted for fixing the exhaust gas dividing portion 200 to the apparatus casing 12.

On the drain receiving portion 202, a plurality of burring holes 202a are formed. Further, at both lateral ends of the drain receiving portion 202, a drop prevention portion 204 for preventing drop of the drain is provided as shown in FIG. 3.

The drain evaporator 100 has a drain evaporation portion 101 for evaporating the received drain and a drain evaporator fixation portion 110 for fixing the drain evaporator 100 to the combustion chamber 20. The drain evaporation portion 101 is made of a ceramic plate which has drain resistance property, heat resistance and hydrophilicity.

Figure 2:
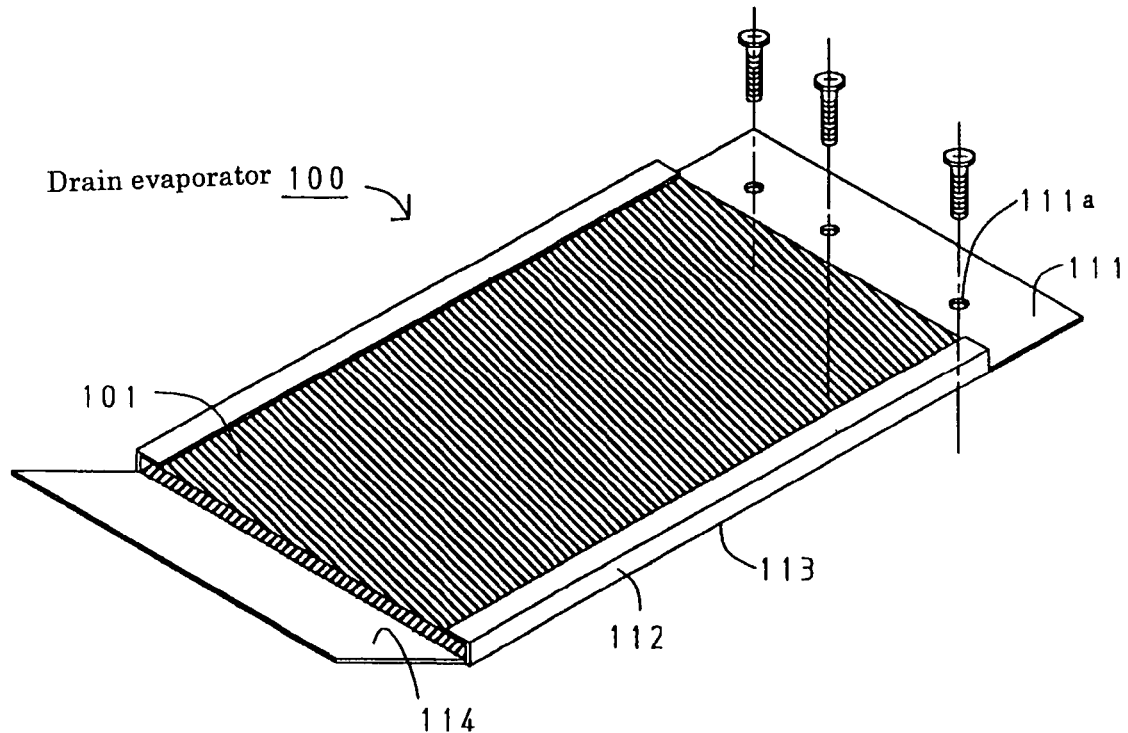
FIG. 2 is an explanatory view of a drain evaporator of the embodiment of the present invention.

As shown in FIG. 2, the drain evaporator fixation portion 110 is made of one stainless steel plate. It includes a combustion chamber fixation portion 111 for being fixed to the combustion chamber, a fixation portion 112 for binding and supporting the drain evaporation portion 101 and a supporting portion 113 for placing and supporting the drain evaporation portion 101, and a drain drop prevention portion 114 for preventing drop of the drain.

On the combustion chamber fixation portion 111, provided is a screw hole 111a into which a stainless steel screw is inserted for fixing the drain evaporator 100 to the combustion chamber 20.

The fixation portion 112 is formed in an open-box shape at lateral ends of the supporting portion 113.

As shown in FIG. 1, the supporting portion 113 is provided with the combustion chamber 20 so as to be sloping upward at a level of about 10 degrees against the combustion chamber 20.

As shown in FIG. 1, the drain drop prevention portion 114 is sloping upward to the outlet 44b at a level of about 10 degrees in order to prevent the drain from dropping to the outside of an apparatus.

After drain generated in the secondary heat exchanger 19 drops on the drain receiving portion 202 through the fins 19b, it passes through the burring holes 202a and drops on the drain evaporation portion 101. The drain evaporation portion 101 is made by a hydrophilic porous ceramic, so that the dropped drain diffuses over the same.

Next, the operation of the water heater 10 thus configured will be briefly explained.

When a water tap (not shown) is opened, water flows into the cold water supply pipe 14 (a dotted arrow in the drawings), and a burner controller 58 detects a signal from the water flow sensor in the water side control unit 50 and operates the blower 36. Then, a main electromagnetic valve 54 and a proportional valve 56 are opened to allow the burner 22 to be ignited.

After ignition of the burner, the proportional valve 56 is controlled according to the difference between the heated water temperature and the set temperature. As a result, the hot water temperature from the main heat exchanger 18 is maintained at a predetermined level. Further, the amount of air from the blower 36 is controlled according to the amount of fuel gas.

Guided by the blower 36, hot exhaust gas from the burner 22 passes through between the fins 18b of the main heat exchanger 18 which is provided at the upstream of an exhaust gas route. In this way, heat exchange is conducted.

In this main heat exchanger 18, only sensible heat of the exhaust gas is recovered in order to prevent drain generation.

Then, as shown in FIG. 2, the exhaust gas passing through the main heat exchanger 18 is divided into two directions by the exhaust gas dividing portion 200, one of which is guided to the secondary heat exchanger 19 and the other is to the drain evaporator 100.

The exhaust gas guided into the secondary heat exchanger 19 is used for heat exchange again, and discharged from the outlet 44a to the outside of the apparatus.

On the other hand, the exhaust gas guided into the drain evaporator 100 is used for evaporation of condensed drain, and discharged from the outlet 44b to the outside of the apparatus.

In the secondary heat exchanger 19, the exhaust gas passing through the main heat exchanger 18 is further condensed into drain while recovering latent heat, and at the same time, sensible heat which has not been recovered in the main heat exchanger is recovered.

It should be noted that in the main heat exchanger 18, only sensible heat of exhaust gas is recovered so as not to generate drain. In this recovery, the exhaust gas is supposed to be maintained at a high temperature in order to prevent drain generation even in a low temperature portion in the main heat exchanger 18. As a result, recovery of the sensible heat is not conducted sufficiently.

However, in the secondary heat exchanger 19 where there is no need to prevent drain generation, it is possible to generate drain and recover latent heat from the same. Moreover, it is possible to recover sensible heat completely even though the recovery of the sensible heat is insufficient in the main heat exchanger 18.

In the above situation, the exhaust gas passing through the secondary heat exchanger 19 is at a high temperature because it does not pass through the drain evaporator 100. Thus, the difference in temperature between the exhaust gas and the secondary heat transfer tube 19a is large, so that a speed of heat transfer can be rapid from the exhaust gas to the secondary heat transfer tube 19a, resulting that recovery of sensible heat is conducted efficiently.

Further, after drain in the secondary heat exchanger 19 drops on the drain receiving portion 202 through the fins 19b, it passes through the burring holes 202a and drops on the drain evaporation portion 101. The drain evaporation portion 101 is a hydrophilic porous ceramic, so that the dropped drain diffuses over the same.

In the drain evaporator 101, drain contacts with the exhaust gas which is passing through the main heat exchanger 18, and thus, it is heated for evaporation.

In the above case, as drain is diffused over the drain evaporation portion 101, a contact area of the drain with the exhaust gas is fairly large. Further, the exhaust gas is at a high temperature because it does not pass through the secondary heat exchanger 19. Accordingly, drain evaporation is conducted efficiently.

Further, as the exhaust gas passes through the drain evaporator 100 without passing through the secondary heat exchanger 19, it is unnecessary to limit heat recovery efficiency of the exhaust gas in the secondary heat exchanger 19 for drain evaporation. On the other hand, in a conventional water heater, as the exhaust gas passes through the secondary heat exchanger 19 before it is guided to the drain evaporator 100, it is necessary to limit the heat recovery efficiency in the secondary heat exchanger 19 for drain evaporation.

It should be noted that drain also evaporates while it drops from the drain receiving portion 202 to drain evaporation portion 101, not only on the drain evaporation portion 101. Thus, by extending the distance between the drain receiving portion 202 and the drain evaporation portion 101, the dropping time of the drain will be longer, hence it is possible to shorten the evaporation time of the drain.

The above description of the embodiment of the present invention has in no way been provided for the purpose of limiting the present invention, and it is of course possible to diversely embody the present invention within the scope not departing from the essential points of the present invention.

As an example of an altered embodiment, a setting portion of a drain receiver is not limited to the embodiment, and the positional relationship among the burner, the main heat exchanger and the secondary heat exchanger is not limited to the embodiment. For example, from the upper portion of the combustion chamber, a burner whose flame port is turned downward, the main heat exchanger, the secondary heat exchanger and the drain evaporator may be provided, and some amount of the exhaust gas passing through the main heat exchanger may be introduced to the drain evaporator using a current plate. With this configuration, clogging of the main heat exchanger by drain can be prevented because the drain never drops on the main heat exchanger.

In addition, the main heat exchanger and the secondary heat exchanger are not limited to a fin tube type as long as it conducts condensation exchange. Moreover, the secondary heat transfer tube is not limited to be made of stainless steel, as long as it includes corrosion resistance.

Further, the drain evaporator is not limited to a configuration in which a stainless steel plate and a ceramic plate are superimposed, and ceramic coating or titanium coating having corrosion resistance may be applied to the surface of the stainless steel plate. Moreover, the drain evaporator may have a configuration in which a plurality of stainless steel filters are superimposed under the exhaust gas dividing portion, and the exhaust gas heat passes between the filters. With this configuration, the drain passes through the layer the stainless steel filters one by one. Moreover, the stainless filters have an excellent thermal conductivity and the layer of the stainless steel filters increase a contact area of the drain with the exhaust gas, hence it is possible to shorten the evaporation time of the drain.

The present invention may be applied to a spontaneous combustion type water heater, other than to a compulsory combustion type water heater with a blower. Moreover, the present invention is not limited to an apparatus having a single function of supplying hot water, and may be applied to a water heater with a function of reheating a bath or with a heating function.

What is claimed is:

1. A water heater comprising:
    a burner for burning fuel gas in a combustion chamber;
    a main heat exchanger which recovers sensible heat from exhaust gas discharged from the burner to heat flowing water in a heat transfer tube;
    a secondary heat exchanger which recovers sensible heat which has not been recovered in the main heat exchanger along with latent heat from the exhaust gas which is passing through the main heat exchanger to heat the flowing water in the heat transfer tube, and
    a drain evaporator which heats and evaporates drain generated by recovery of the latent heat in the secondary heat exchanger, wherein a route of the exhaust gas which is passing through the main heat exchanger is divided into a first exhaust route and a second exhaust route, and the secondary heat exchanger is provided with the first exhaust route and the drain evaporator is provided with the second exhaust route.

2. A water heater comprising:
    a burner for burning fuel gas in a combustion chamber;
    a main heat exchanger which recovers sensible heat from exhaust gas discharged from the burner to heat flowing water in a heat transfer tube;
    a secondary heat exchanger which recovers sensible heat which has not been recovered in the main heat exchanger along with latent heat from the exhaust gas which is passing through the main heat exchanger to heat the flowing water in the heat transfer tube, and
    a drain evaporator which heats and evaporates drain generated by recovery of the latent heat in the secondary heat exchanger, wherein on a route of the exhaust gas which is passing through the main heat exchanger, the secondary heat exchanger and the drain evaporator are disposed in parallel avoiding that one of them is located at the upstream or downstream of the other.

* * * * *